INVENTORS.
ROBERT T. ADAMS
JACK B. HARVEY
BY
ATTORNEY

INVENTORS.
ROBERT T. ADAMS
JACK B. HARVEY
BY [signature]
ATTORNEY

INVENTORS.
ROBERT T. ADAMS
JACK B. HARVEY
BY
ATTORNEY

INVENTORS.
ROBERT T. ADAMS
JACK B. HARVEY
BY [signature]
ATTORNEY

INVENTORS.
ROBERT T. ADAMS
JACK B. HARVEY
BY [signature]
ATTORNEY

INVENTORS.
ROBERT T. ADAMS
JACK B. HARVEY
BY Percy P. Lantzy
ATTORNEY

INVENTORS.
ROBERT T. ADAMS
JACK B. HARVEY
BY
ATTORNEY

INVENTORS.
ROBERT T. ADAMS
JACK B. HARVEY
BY
ATTORNEY

INVENTORS.
ROBERT T. ADAMS
JACK B. HARVEY
BY [signature]
ATTORNEY

INVENTORS.
ROBERT T. ADAMS
JACK B. HARVEY
BY [signature]
ATTORNEY

INVENTORS.
ROBERT T. ADAMS
JACK B. HARVEY
BY
ATTORNEY

United States Patent Office 3,195,069
Patented July 13, 1965

3,195,069

SIGNAL GENERATOR HAVING A CONTROLLABLE FREQUENCY CHARACTERISTIC

Robert T. Adams, Short Hills, and Jack B. Harvey, Clifton, N.J., assignors to International Telephone and Telegraph Corporation, Nutley, N.J., a corporation of Maryland Filed July 20, 1960, Ser. No. 44,062
1 Claim. (Cl. 331—39)

This invention relates to signal generators and more particularly to a signal generator for generating a signal having a controllable frequency characteristic.

One of the fields in which controllable-frequency-characteristic signal generators have considerable importance is that of electrical circuit measurements, in which a signal generator generating a signal having a linear swept-frequency characteristic is utilized to provide a continuous indication of the equipment under measurement over a given frequency bandwidth. In the past, swept-frequency generators were commonly utilized to perform this function. By properly employing the swept-frequency generator in conjunction with an oscilloscope, it is possible to obtain a picture of the response curve of the equipment under test, for instance, the bandpass characteristics or discriminator characteristics of amplifiers and discriminators, respectively. The time saved in adjusting or calibrating an electrical circuit for optimum results when employing swept-frequency generators is relatively large when compared to a point-by-point measuring technique.

Swept-frequency generators have heretofore employed an oscillator having the frequency of the output-signal frequency modulated, i.e., swept or deviated over a given frequency range in a predetermined manner by mechanical or electronic means external to the oscillator. Thus, at the output of the swept-frequency generators of the prior art, there was provided a signal having a changing frequency characteristic, the most common of these being a frequency characteristic which varies linearly with time. Examples of previously employed swept-frequency generators include a reactance tube cooperatively coupled to an oscillator and an external sawtooth sweep generator operating upon the reactance tube to frequency modulate the frequency of the output signal of the oscillator. Another technique for frequency modulating an oscillator output signal includes varying the reflector voltage of a klystron oscillator in accordance with a sawtooth signal provided by an external sawtooth sweep generator. Several external mechanical arrangements also have been previously employed in conjunction with oscillator circuits to provide the frequency modulation of the oscillator output signal, examples of which include a variable condenser incorporated in the oscillator resonant circuit driven by an external motor, and the mechanical tuning of the resonant cavity of a reflex klystron oscillator by external means.

One of the inherent problems in all of these previously employed swept-frequency generators is the maintenance of the output signal produced by the generator at a constant amplitude over the entire frequency band swept to achieve the desired precision of operating characteristic measurement and/or alignment of a circuit component or system under test. Complicated arrangements have been employed in the past to assure that the output signal of the swept-frequency generator was maintained at a constant amplitude as the frequency is swept across a given frequency range. Certain of these amplitude-control circuits have included a precise mechanical linkage to cause the mechanical resonant-cavity-tuning device and reflex voltage of a reflex-klystron oscillator to track each other to maintain the output of the oscillator at a relatively constant amplitude as the frequency of the output signal is swept through a desired frequency range. Other arrangements have employed complicated servo-control loops to assure the achievement of the desired constant-amplitude output signal over the entire frequency range.

An object of this invention is to provide an improved signal generator generating a signal having a controllable frequency characteristic eliminating the previously employed external arrangements to modulate, mechanically or electronically, the frequency of the generated signal.

Another object of this invention is to provide a signal generator generating an output signal having a controllable frequency-versus-time slope and a substantially constant amplitude as the output signal is swept through a given frequency range without resort to frequency modulation of an oscillator.

Still another object of this invention is to provide a signal generator generating an output signal having a frequency characteristic providing a single channel of intelligence signals or a plurality of channels of intelligence signals multiplexed either on a frequency or time-division basis for data-transmission purposes.

A feature of this invention is the provision of a signal generator comprising a loop network for the recurrent circulation therein of a signal having a given frequency characteristic, a means to initiate the signal within the loop network for the desired recurrent circulation and an output means coupled to the loop network to extract the signal during preselected ones of the circulations. The loop network includes a time-offsetting means to delay the signal a predetermined time interval during each of the circulations and a frequency-transducing means to vary the given frequency characteristic of the signal in a predetermined manner during each of the circulations to control the frequency characteristic of the resultant output signal present at the output means of the generator.

Another feature of this invention is the provision of a filter network included in the output means of the signal generator of this invention to extract the circulating signal after each circulation and provide a signal output having a swept-frequency characteristic. The resultant swept-frequency characteristic may be controlled to be linear or non-linear by the value of the time delay in the time-offsetting means and the frequency deviation in the frequency-transducing means encountered by the signal in each circulation around the loop network.

Still another feature of this invention is the capability of operating the signal generator of this invention as either a free-running or triggered swept-frequency generator by altering the initiating means and the loop gain of the loop network. The free-running version of the swept-frequency generator of this invention is provided by a loop network having a loop gain greater than one. Under this condition, the loop network behaves like an oscillator, and the power supply of one of the components of the loop network will be the initiating means. The triggered version of the swept-frequency generator of this invention is provided by a loop network having a loop gain less than one and by initiating in the loop network a burst of constant-frequency signal, or a swept-frequency signal approximating the frequency-versus-time slope of the resultant swept-frequency signal.

A further feature of this invention is the provision of one intelligence signal operating as the initiating means for the signal generator of this invention to provide a single-channel data-transmission system. A plurality of data-transmission channels may be provided at the output of the signal generator of this invention either multiplexed on a time or frequency-division basis or both by appropriately timing the application of a plurality of intelligence signals to the loop network and the removal of the circulating signals from the loop network.

The above-mentioned and other features and objects of this invention will become more apparent by reference to the following description taken in conjunction with the accompanying drawings, in which.

Figure 1:
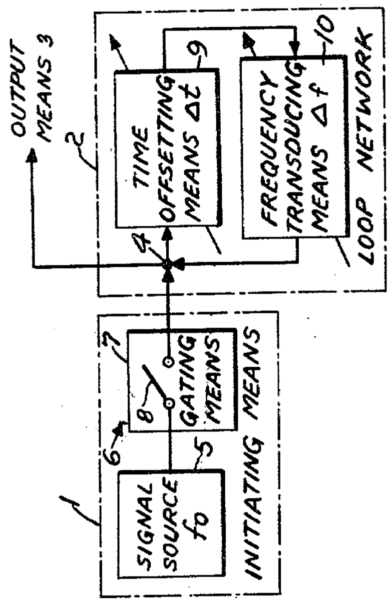
FIG. 1 is a schematic diagram in block form of a signal generator following the principles of this invention.

Now referring to FIG. 1, the signal generator of this invention is illustrated as including initiating means 1 coupled to loop network 2 to initiate a signal having a given frequency characteristic for recurrent circulation therein. Output means 3, illustrated as a conductor in FIG. 1, is coupled to point 4 to extract the signal at this point from loop network 2 to provide an output signal of the signal generator.

Initiating means 1 may comprise a signal source 5 producing a signal having a given frequency characteristic. By way of example, source 5 may be a continuous-wave oscillator generating a continuous wave having a fixed frequency $f_0$. Initiating means 1, also includes means 6 to couple signal source 5 to the loop network 2. More specifically, means 6 may include a suitable gating means 7 illustrated to be a switch 8. When switch 8 is operated, the signal of source 5 is injected into loop network 2 to initiate a recurrent circulating signal in loop network 2. It is to be understood that the gating means 7 may be the manual switch 8 or may be an automatic switch or gate arrangement.

The loop network 2 includes a variable time-offsetting means 9, for example, a delay line or other equivalent delay device, to delay the signal circulating in the loop for a time-delay interval $\Delta t$ which may have a constant value or may be varied in accordance with a predetermined relationship. The finite time delay inherent in all electrical devices may be sufficient to supply the time-delay interval $\Delta t$ without requiring per se the use of a separate physical time-delay device; or, on the other hand, where a physical time-delay device is utilized, the inherent time delay of the system may supplement the time delay of the device to equal the required $\Delta t$.

Loop network 2 further includes a variable-frequency transducing means 10 which varies or deviates the frequency characteristic of the signal circulating in the loop in accordance with a predetermined relationship. For the operation of the signal generator of this invention, it is immaterial whether time-offsetting means 9 precedes frequency-transducing means 10 in the loop network 2, as illustrated in FIG. 1, or whether their positions are reversed.

Figure 2:
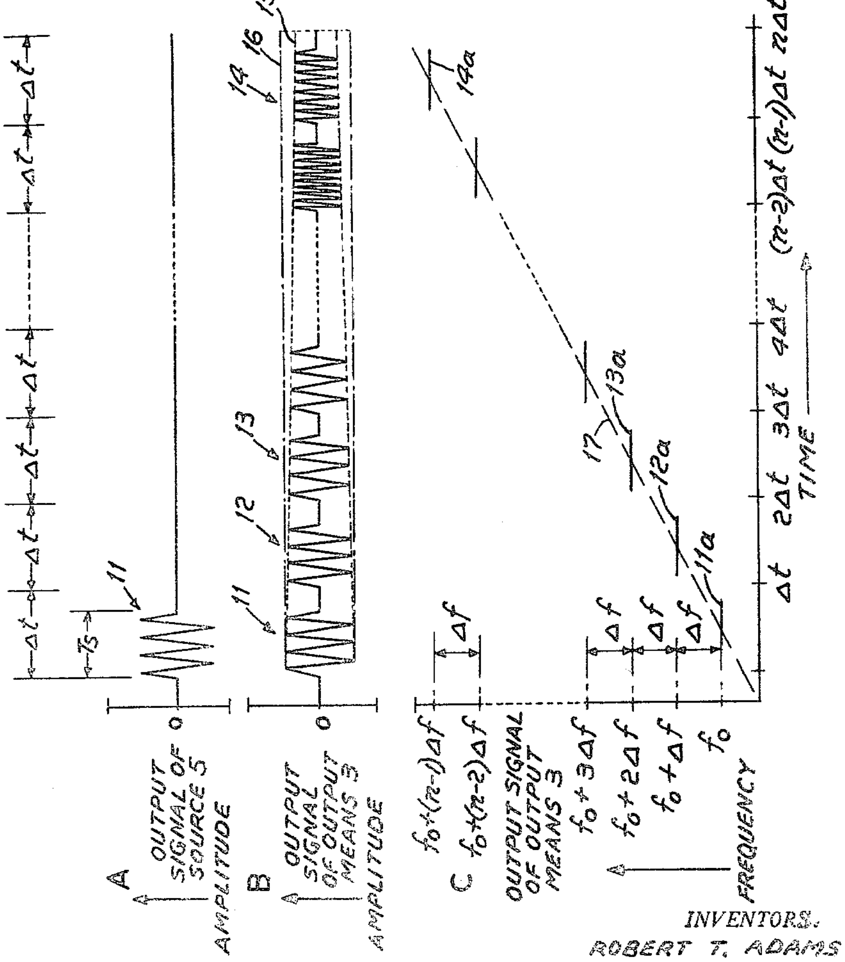

Referring to FIG. 2, the operation of the signal generator of FIG. 1 will be described. Switch 8 of initiating means 1 at time $t_0$ is closed temporarily for a gating or switching time period $T_s$, thus allowing signal source 5 to initiate a signal 11, Curve A, FIG. 2, having the frequency $f_0$ in loop network 2 during the period $T_s$. The gating period $T_s$ may be made equal to the time delay interval $\Delta t$, or as shown in FIG. 2 may be less than $\Delta t$. Furthermore, as explained in a subsequent embodiment, the gating period $T_s$ may be made larger than $\Delta t$. Simultaneously, the initial signal 11 appears in output means 3 as illustrated in Curve B, FIG. 2. The signal 11, in circulating through the loop network 2, encounters a time delay $\Delta t$ provided by time-offsetting means 9 and a frequency deviation provided by frequency-transducing means 10. For explanation purposes only, frequency-transducing means 10 is adjusted to deviate the frequency of signal 11 in a constant manner and by an amount equal to a negative or, as illustrated in FIG. 2, a positive $\Delta f$. This may be accomplished by the utilization of suitable heterodyning and filtering techniques, or other similar techniques which may include frequency multipliers, frequency dividers and the like. As a consequence of signal 11 being time offset and frequency deviated, a signal 12, Curve B, FIG. 2, appears at point 4 and, hence, output means 3. Signal 12, which now has a frequency equal to $f_0+\Delta f$, is recirculated in the loop network 2, where it also encounters the same time offset $\Delta t$ and positive frequency deviation $\Delta f$. Upon completion of the circulation, signal 12 appears at point 4 and output means 3 as signal 13, Curve B, FIG. 2 having a frequency equal to $f_0+2\Delta f$. Signal 13 is now ready for circulation in loop network 2. The recirculation process continues until the time when the signal has been attenuated to the extent that there would not be sufficient energy in the loop to provide an output. This is illustrated in FIG. 2 by signal 14 at the end of the $n$th interval, where its amplitude as represented by line 15 is lower than line 16, which represents the amplitude of the initial signal 11 and, hence, the constant-amplitude line. To maintain a constant-amplitude signal at output means 3, loop network 2 would have sufficient gain as may be provided by an amplifier (not shown) to overcome the attenuation of network 2. It is also understood that the circulations may be cut off after any predetermined number of circulations, the time of cutoff being chosen so that the amplitude reduction by loop attenuation is negligible. The circulation cutoff may be accomplished, for example, by suitable timing or gating means, filters and the like disposed in the loop (not shown). Curve C, FIG. 2 represents signals 11, 12, 13 and 14, Curve B, FIG. 2, on a frequency-versus-time basis rather than amplitude versus time to demonstrate the frequency characteristic of the signal at output means 3.

The resultant output signal is a series of signals 11_a_, 12_a_, 13_a_ and 14_a_, which has linearly increased in frequency by an amount $\Delta f$ during each time interval $\Delta t$. By suitable choice of the magnitude of $\Delta f$ and $\Delta t$, the ideal swept-frequency signal 17 having a linear slope $$\frac{\Delta f}{\Delta t}$$

can be approached.

Figure 3:
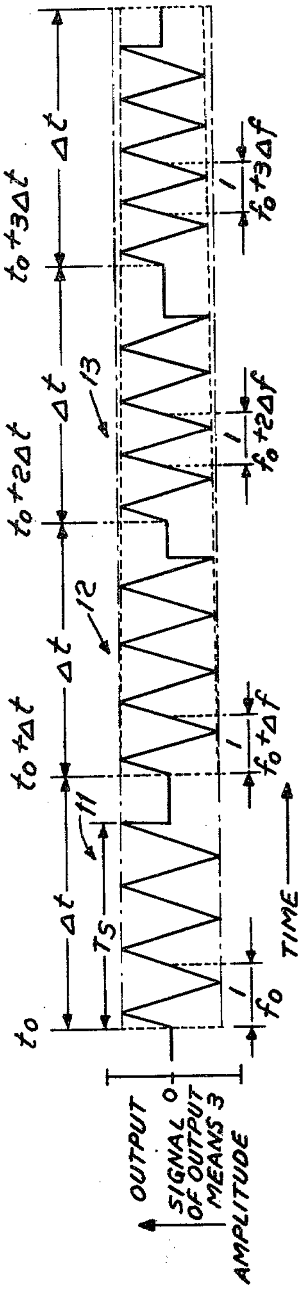
FIGS. 2 and 3 illustrate waveforms helpful in explaining the operation of the signal generator of FIG. 1.

Referring to FIG. 3, there is illustrated therein an enlarged version of Curve B, FIG. 2 to illustrate the frequency deviation imparted to the circulating signal in loop network 2.

In reference to FIGS. 2 and 3, it should be borne in mind that the waveforms depicted therein are exaggerated for the purposes of illustration and clarity.

Figure 4:
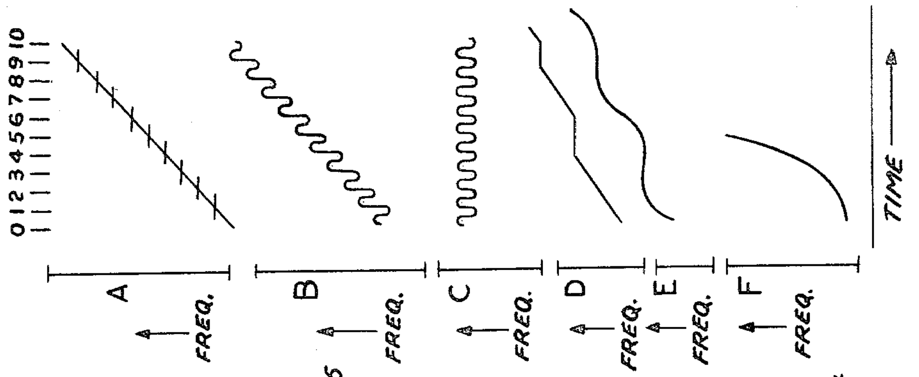
FIG. 4 illustrates other waveforms that are obtainable at the output of the signal generator of FIG. 1.

Referring to FIG. 4, there are illustrated some typical output signals, Curves A, B, C, D, E and F, available at the output of the signal generator of this invention. The different output signals are obtained by controlling variable-frequency transducing means 10 to produce a variable frequency output therefrom and injections of a predetermined frequency in loop network 2. For example, Curve A is the same as Curve C, FIG. 2 produced by a constant-$\Delta f$ output signal from means 10 and a constant-$f_0$ input signal to loop network 2. The parabola, Curve F, FIG. 4 may be produced by the incorporation of a frequency doubler as the frequency-transducing means 10 of FIG. 1. Curves B, C, D and E may be obtained by controlling the frequency characteristic of the output signals of source 5 to provide a variable-frequency output, and/or the wave shape of the signals of source 5, alone or in combination with control of the frequency-transducing means 10 and/or time-offsetting means 9. For instance, Curves B and C, FIG. 4, may be produced by an output signal of source 5, whose frequency varies sinusoidally, with a constant $\Delta f$ transducing by means 10 for Curve B and no $\Delta f$ transducing by means 10 for Curve C. Curves D and E are examples of curves obtained with variable-frequency signal output of source 5 and variable-frequency transducing by means 10. It should be noted that, if time-offsetting means 9 is not a constant function of frequency, there will be produced a non-linear frequency-slope characteristic. This fact can be employed to produce any desired monotonic frequency-versus-time characteristic.

Figure 5:
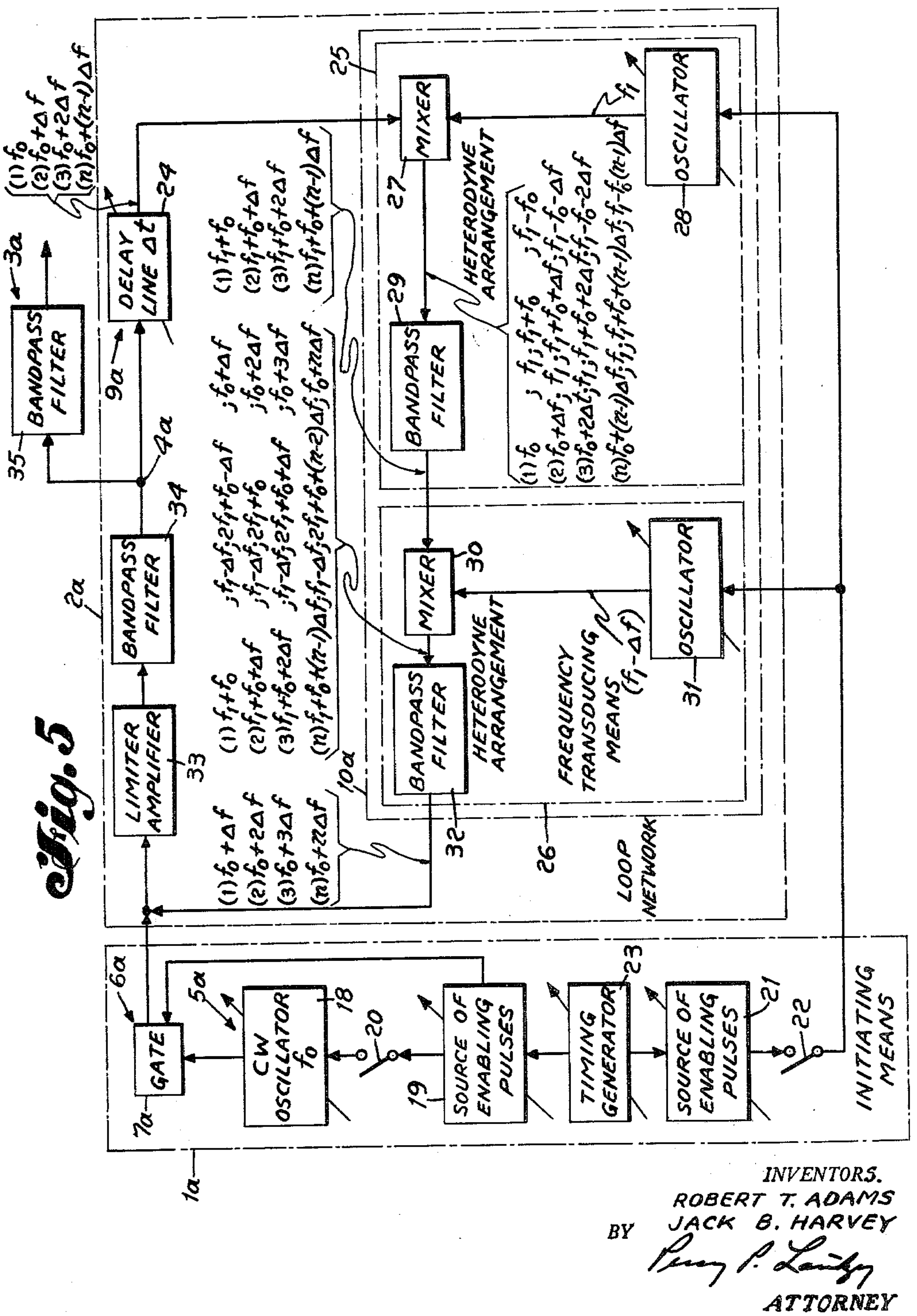
FIG. 5 is a schematic diagram in block form illustrating in detail one embodiment of a signal generator following the principles of this invention as illustrated in FIG. 1.

Referring to FIG. 5, there is illusrated an embodiment of the signal generator of this invention, disclosing some details that may be employed in the signal generator of FIG. 1. An initiating means 1a includes signal source 5a in the form of a signal generator having a given frequency characteristic illustrated as a continuous-wave oscillator 18 having a fixed frequency $f_0$ coupled to coupling means 6a illustrated as an electronic gating means 7a. A means in the form of source 19 of enabling pulses controls the operation of the coupling means 6a. The enabling pulses of source 19, if desired, may also control the operation of continuous-wave oscillator 18, thus conserving power during the period when oscillator 18 is not being utilized. In this case, source 19 would be coupled to oscillator 18 by means of the switch 20. Thus, after the gating period $T_s$, oscillator 18 is shut down. For a similar reason, a source 21 of enabling pulses may be coupled to variable-frequency transducing means 10a by means of switch 22, if desired, to control the period of operation thereof to coincide with the period of the output signal or, in other words, the number of circulations in loop network 2. The starting time $t_0$ of the gating period $T_s$ of gating means 7a is controlled by a timing generator 23 activating source 19. In addition, timing generator 23 is utilized to synchronize the operation of source 19 and source 21.

Coupled to the output of initiating means 1a is loop network 2a, which includes a variable-time-offsetting means 9a illustrated as a variable delay line 24 which has its time-delay interval $\Delta t$ adjusted, by way of example only, to a constant interval. Loop network 2a also includes a variable-frequency transducing means 10a. As mentioned before, variable-frequency transducing means 10a may include suitable heterodyning and frequency-selecting means, such as a filter arrangement, although it is not meant to limit means 10a to such arrangements. It is obvious other types of frequency transducing means, as for example, the aforementioned frequency multipliers, dividers, doublers, etc., may be substituted for the suggested heterodyning and filtering arrangements without departing from the scope of this invention. As illustrated in FIG. 5, by way of example only, a double-heterodyne arrangement is utilized as the frequency-transducing means 10a. Accordingly, variable transducing means 10a includes tandem-connected heterodyne arrangements 25 and 26. Heterodyne arrangement 25 includes a mixer 27 having its input coupled to the output of delay line 24. Variable oscillator 28, which has been adjusted, by way of example only, to generate signals having a frequency $f_1$, is coupled to the other input of mixer 27 in a well known manner so as to produce a signal at the output of mixer 27 having frequency components that are equal to the individual frequencies appearing at its input, as well as the sum and difference frequencies of the input signals. As explained hereinafter, one of the components is selected by means of a frequency-selecting means illustrated to be bandpass filter 29 to serve as an input signal to a mixer 30 of the heterodyne arrangement 26. Also coupled to the mixer 30 is variable oscillator 31 which generates signals which, by way of example only, have a frequency equal to $f_1-\Delta f$. At the output of mixer 30, there appears a signal having frequency components equal to the individual frequencies of the signals present at its inputs as well as frequency components equal to their sum and difference. The frequency-selecting means, illustrated to be bandpass filter 32, provides means to select a predetermined component which is circulated in loop network 2a, as explained hereinafter. The loop network 2a further includes a limiter amplifier 33 which provides a constant amplitude for each circulating signal in the loop network 2a, and a bandpass filter 34 which attenuates any harmonic frequencies that are generated in limiter amplifier 33.

Output means 3a includes a bandpass filter 35 to eliminate any side-band frequencies that may be present due to the effects of the time-offsetting means 9a and frequency-transducing means 10a which effectively amplitude and frequency modulate, respectively, the circulating signal. Bandpass filter 35 also provides a smoothing effect in the output-signal frequency characteristic.

The operation of the embodiment of FIGURE 5 is as follows. With the switch 20 closed, an enabling pulse from source 19 simultaneously initiates the operation of continuous-wave oscillator 18 and gating means 7a causing the initiating means 1a to initiate a signal in the form of a burst of continuous-wave energy chosen, by way of example only, to have a fixed frequency $f_0$ into loop network 2a for the recurrent circulation therein. The width of the burst of continuous-wave energy is controlled by the cooperative action of the enabling pulse of source 19 and gating means 7a. In the embodiment of FIG. 5, the width of the burst of energy is less than or equal to the time-delay interval $\Delta t$. The initial signal, upon entering the loop, is coupled to limiter amplifier 33 and hence to bandpass filter 34. The signal thus appears at the point 4a having a constant amplitude and is devoid of any harmonic frequency components that may have been generated in limiter amplifier 33. As in the embodiment of FIG. 1, the signal of FIG. 5 encounters a time delay $\Delta t$ and a frequency deviation $\Delta f$ due to the presence of time-offsetting means 9a and frequency-transducing means 10a, repectively, in loop network 2a. The frequencies that appear at various points in loop network 2a during the circulation therein are indicated on the drawing, the particular circulation of the signal being identified by (1), (2), (3) to ($n$). During the first circulation, (1) the initial signal whose frequency is $f_0$ is coupled to mixer means 27 along with the signal of oscillator 28 whose frequency is $f_1$. As is well known in the art, at the output of mixer means 27 there will appear a signal having the frequency components $f_0$; $f_1$; $f_1+f_0$; $f_1-f_0$ as indicated. By way of example only, bandpass filter 29 is adjusted to have a cutoff frequency slightly less than the sum frequency component $f_1+f_0$ and therefore will pass $f_1+f_0$ in first circulation (1) as indicated at the output of mixer 29. This frequency component is in turn mixed by means of mixer 30 with the signal of oscillator 31 whose frequency is, by way of example only, $f_1-\Delta f$. At the output of second mixer 14, there appears in the first circulation (1) a signal having a frequency component $f_1+f_0$; $f_1-\Delta f$; $2f_1+f_0-\Delta f$; and $f_0+\Delta f$, which are the individual frequency components as well as the sum and difference frequency components, respectively, of the signals appearing at the inputs of mixer 30; as shown. Bandpass filter 32 is adjusted, by way of example only, to have a cutoff frequency slightly less than $f_0+\Delta f$. Thus, the signal having a frequency $f_0+\Delta f$ is passed to limiter amplifier 33 where its output is maintained at the preselected constant-energy amplitude. Bandpass filter 34 then passes the signal having a frequency equal to $f_0+\Delta f$, free of harmonics as above explained, to point *4a*. The new signal component at point *4a* is now ready to be recirculated within the loop network *2a* whereupon it again encounters a time delay $\Delta t$ and appears at the input of mixer 27 with a frequency of $f_0+\Delta f$ as indicated at (2) at the input of mixer 27. This signal is again mixed with the frequency, $f_1$, of oscillator 28 whereupon the signal appears at the output of mixer 27 with the frequency components illustrated at (2) at the output of mixer 27. Bandpass filter 29 similarly passes only the frequency $f_1+f_0+\Delta f$ as shown at (2) at the output of filter 29. The signal thus has a frequency $f_1+f_0+\Delta f$ which is now mixed with the frequency of oscillator 31 to produce the frequency components that are designated at (2) at the output of mixer 30. Again, bandpass filter 32 passes the frequency difference component, $f_0+2\Delta f$ as illustrated at (2) at the output of filter 32. This signal is then fed to the input of limiter amplifier 33 to maintain a constant signal amplitude, then to filter 34 and hence to point *4a*. The circulation process is repeated *n* times with the signal in each circulation encountering a time delay $\Delta t$ and a frequency offset $\Delta f$.

At output means *3a*, a signal will be produced having a frequency-swept characteristic appearance similar to that shown at Curve C, FIG. 2. The inclusion of bandpass filter 35, as explained above, tends to smooth the signals *11a*, *12a*, *13a* and *14a* coupled thereto such that the frequency characteristic of the output signal of the signal generator approaches the ideal frequency-swept signal 17 having a linear $\Delta f/\Delta t$ slope. As pointed out with respect to FIG. 1, the value of $\Delta t$ and $\Delta f$ will determine how good this approximation is.

It is to be understood that the signal generator illustrated in FIG. 5 is not limited to the production of linear swept-frequency characteristics, but, as is obvious to one skilled in the art, the principles taught herein may be applied to frequency characteristics having non-linear slopes similar to those illustrated in FIG. 4. One way of effecting non-linearity in the swept-frequency characteristics is to produce a signal having a variable-frequency output at either or both of oscillators 28 and 31, in which case oscillators 28 and/or 31 may be swept externally or may be variable-frequency generators. Likewise, the time delay $\Delta t$ of the time-offsetting means 9 may be separately varied, or may be varied in conjunction with the variation of oscillators 28 and/or 31. Furthermore, as explained previously, the frequency-transducing means of FIG. 5 may comprise other devices such as frequency multipliers, doublers, frequency dividers and the like, in lieu of the heterodyne arrangement illustrated. In the specific embodiment of FIG. 5, it is obvious that a negative or descending linear slope is possible by proper choice of the frequencies of oscillators 28 and 31 and the bandpass characteristics of filters 29 and 32.

As mentioned previously, the source 21 may be utilized to control the action of frequency-transducing means *10a*. As illustrated, when switch 22 is closed, the enable pulses of source 21 are coupled to oscillators 28 and 31 to remove operating power therefrom when not in operation, that is, after the desired number of circulations, or in the alternative, after each or a predetermined number of circulations, have occurred in loop network *2a* to produce the desired output signal for the signal generator. Thus, the source 21 may generate a signal pulse, in which case oscillators 28 and 31 would remain in continuous operation until completion of the predetermined desired number of circulations, or in the alternative source 21 may generate a plurality of pulses, whose number corresponds to the selected predetermined number of circulations within loop network *2a* to operate intermittently oscillators 28 and 31, respectively, only during the actual time of mixing during each signal circulation.

The operations of FIGS. 1 and 5 have been described as producing a single sweep. It is obvious, however, that a plurality of sweeps i.e., a repetitive sweep, is obtainable, for example, by controlling the operation of the switch 8 of FIG. 1 each time a single sweep or a selected portion thereof is generated. Likewise, in FIG. 5 a repetitive sweep is obtained by controlling the action of gating means *7a* by controlling the pulse-repetition frequency of the enabling pulses of source 19 to be periodic or aperiodic such that loop network *2a* is triggered by a signal from initiating means *1a* at the completion of a sweep, or a selected portion thereof. Thus, the operator is capable of controlling the starting time $t_0$ of each sweep by the pulses of source 19. In addition, the operator is also capable of controlling the frequency $f_0$ of the signal initiated in loop network *2a* by adjusting oscillator 18.

Figure 6:
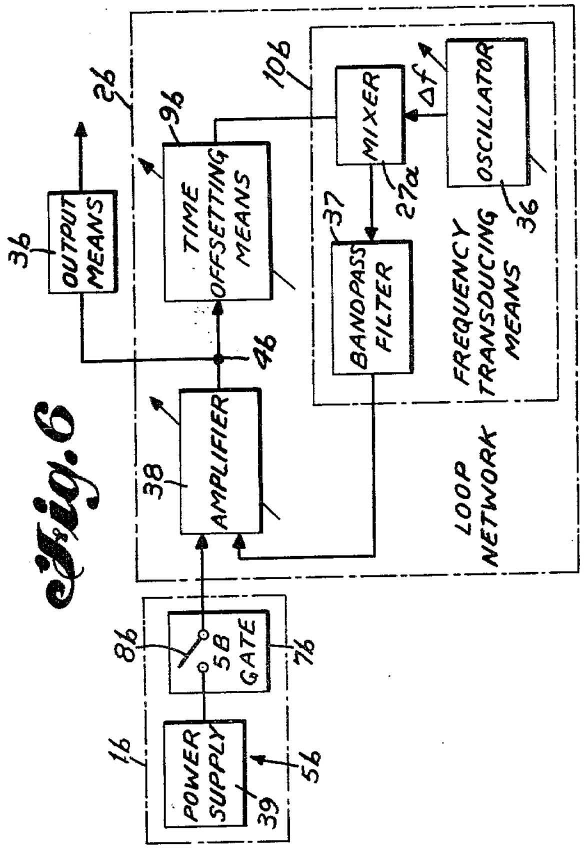
FIG. 6 is a schematic diagram in block form illustrating a free-running embodiment of the signal generator of this invention.

Referring to FIG. 6, there is shown an embodiment of the signal generator of the invention which is operated as a free-running sweep generator, in which case the starting time $t_0$ of each sweep, except for the initial sweep, and ordinarily the initial frequency $f_0$ are not in the control of the operator but are determined solely by the selected parameters of the loop network *2b*, as explained hereinafter. The loop network *2b* comprises time-offsetting means *9b*, having a delay interval $\Delta t$, and frequency transducing means *10b* which, by way of example only, is illustrated as a single heterodyne arrangement including mixer *27a*, oscillator 36 and a frequency-selecting means illustrated as bandpass filter 37, to translate the frequency of a signal appearing at the input of means *10b* by an amount equal to $\Delta f$. Included in the loop netwrok *2b* is a suitable amplifier 38 which is adjusted to provide a loop gain of unity or greater. Also coupled at the point *4b* is a suitable output means *3b*, such as a conductor or a bandpass filter to extract a signal output from the loop network *2b*.

Initiating means *1b* includes a source *5b* of signals illustrated as power supply 39 having a unilateral or direct-current energy to supply the necessary anode and bias voltages for amplifier 38. Source *5b* is coupled to loop network *2b* by coupling means *6b*, illustrated as gating means *7b*, in the form of switch *8b*. The means to control the operation of coupling means *6b* may be manual or automatic. Initiating means *1b* initiates within loop network *2b* a signal having a given frequency characteristic for the recurrent circulation therein, as explained hereinafter.

Figures 7, 10:
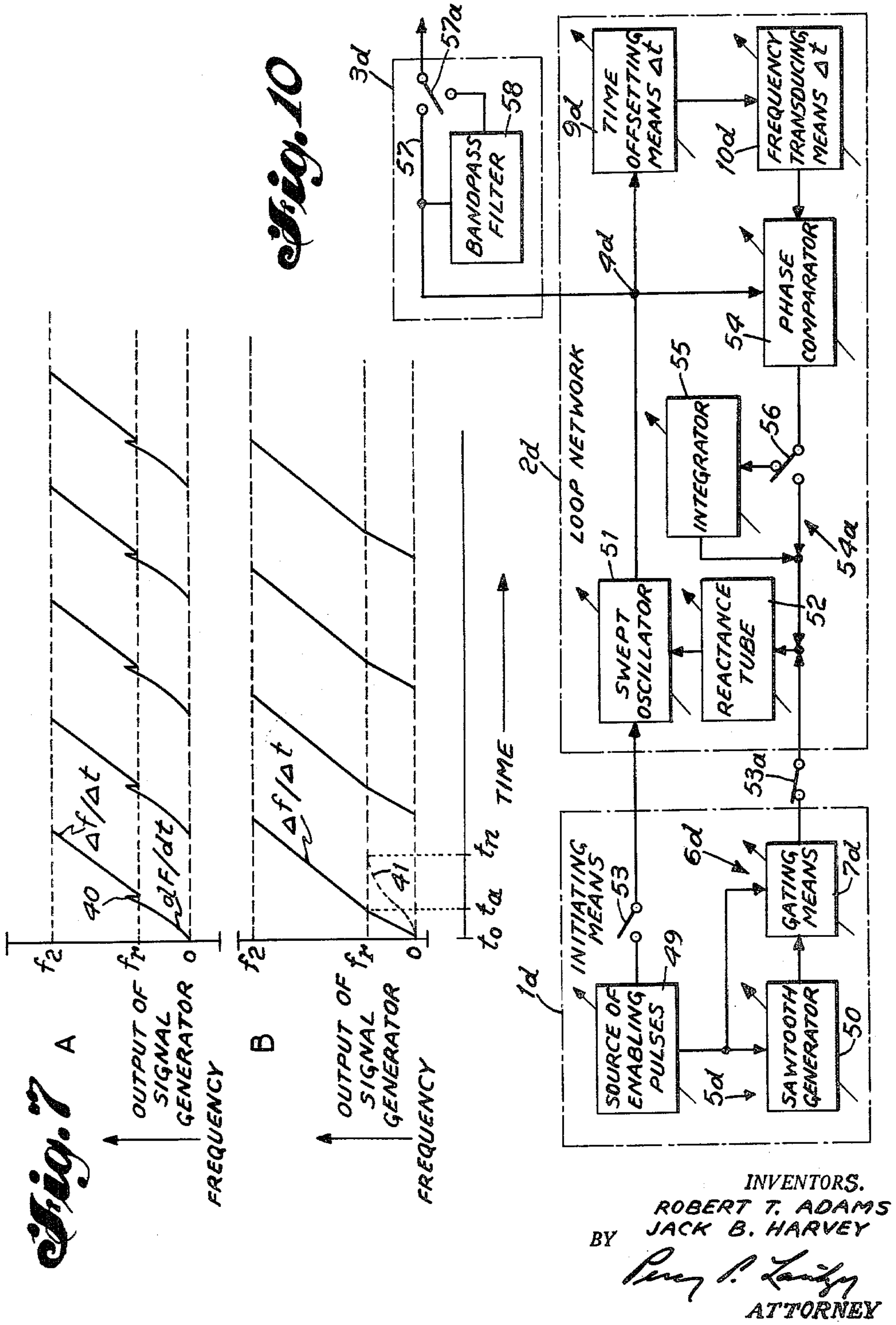
FIG. 7 illustrates waveforms helpful in explaining the operation of the signal generator of FIG. 6.
FIG. 10 is a schematic diagram in block form of still another embodiment of the signal generator of this invention.

Referring to FIG. 7, the operation of the signal generator of FIG. 6 will be described. The signal generator of FIG. 6 operates in a manner similar to that of an oscillator. It is well known that, if there is enough positive feedback in an amplifier circuit, self-sustaining oscillations will be set up, such an arrangement being called an oscillator. Unilateral energy, as for example, direct-current power, supplied to such an amplifier is converted into alternating energy or oscillations, the unilateral energy usually being supplied by a power supply that supplies the electrode voltage to the amplifier. The oscillations build up at a rapid rate to usually a single frequency $f_r$, which is determined by the inherent reactive elements in the circuit, at which point the oscillations become stable. To provide frequencies of oscillations, other than $f_r$, a tank circuit or other reactive device is provided which supplies additional reactance that cooperates with the inherent reactive elements to determine a new stable frequency of oscillation. Accordingly, a signal in the form of direct-current power is supplied to amplifier 38 by a signal source *5b* of unilateral energy (illustrated as power supply 39) when switch *8b* is closed at $t_0$, FIG. 7, to cause oscillations to be built up at a rapid rate, or slope $dF/dt$, in loop network *2b* by reason of amplifier 38 and the positive feedback path comprising time-offsetting means 9$b$ and frequency-transducing means 10$b$. For the sake of simplicity, the signal generator of FIG. 6 is illustrated without additional reactive elements, such that the oscillations would ordinarily tend to build up to $f_r$, the frequency determined by the inherent reactance of the signal generator circuit. It is understood, however, that frequencies other than $f_r$ are obtainable by utilization of the techniques previously mentioned at the beginning of this paragraph without departing from the scope of this invention. Due to the presence of time-offsetting means 9$b$ and frequency-transducing means 10$b$ in loop network 2$b$, the oscillations upon reaching $f_r$ will continue to change at the rate, or slope, $\Delta f/\Delta t$, determined by these means. As shown in Curve A, FIG. 7, if the rate of build-up $dF/dt$ is faster than the rate, or slope $\Delta f/\Delta t$, then the oscillations will be controlled by the combined time-offsetting means 9$b$ and frequency-transducing means 10$b$ shortly after reaching $f_r$. As is well known, if the rate of build-up $dF/dt$ has been quite rapid, then the inertia of the build-up might carry the oscillations momentarily past $f_r$ as indicated at 40, Curve A, FIG. 7, until such time as it is arrested by the effects of the $\Delta f/\Delta t$ slope-producing components, viz., means 9$b$ and 10$b$. However, as illustrated in Curve B, FIG. 7, if the rate $\Delta f/\Delta t$ is greater than the build-up rate $dF/dt$, then the oscillations will be accelerated in approaching $f_r$ as indicated at the time $t_a$. The end of the time required for normal build-up, that is, without the effects of time-offsetting means 9$b$ and frequency-transducing means 10$b$, is indicated at time $t_n$, Curve B, FIG. 7 as well as the waveshape of such a normal build-up, as indicated by the dash line 41. For the sake of clarity, the Curves A and B, FIG. 7, have been exaggerated. It is obvious that the optimum conditions for obtaining a linear slope are enhanced when the build-up rate $dF/dt$ is made substantially equal to the desired slope $\Delta f/\Delta t$. It is to be further understood, that the signal generator of FIG. 6 has been described as generating a positive linear swept-frequency signal only by way of example to teach the principles of this invention, and that swept-frequency signals having negative, as well as non-linear, slopes may also be generated as explained previously in describing our other embodiments. As illustrated in FIG. 7, the oscillations will continue until reaching a frequency $f_2$ whereupon the signal at output means 3$b$ is no longer present due to any of the reasons aforementioned in explaining the operation of other embodiments of the signal generator of this invention, e.g., attenuation, filter bandpass characteristic and the like. If, as in the preferred operation, the signal generator of FIG. 6 is to be free running, then switch 8$b$ remains closed, whereupon the swept-frequency output signal will repeat itself in the manner described above due to the ever present direct-current energy of power supply 39. Hence, it is seen that the unilateral-energy signal of initiating means 1$b$ has initiated an alternating-energy signal in loop network 2$b$ which is recurrently circulated.

A negative linear swept-frequency signal may be obtained by having the loop network 2$b$ of FIG. 6 oscillate at an initial frequency, say $f_2$ of Curve A, FIG. 7, and the frequency-transducing means 10$b$ of FIG. 6 arranged to reduce the initial frequency by $\Delta f$ until a final frequency is reached, say $f_r$ of Curve A, FIG. 7.

Figure 8:
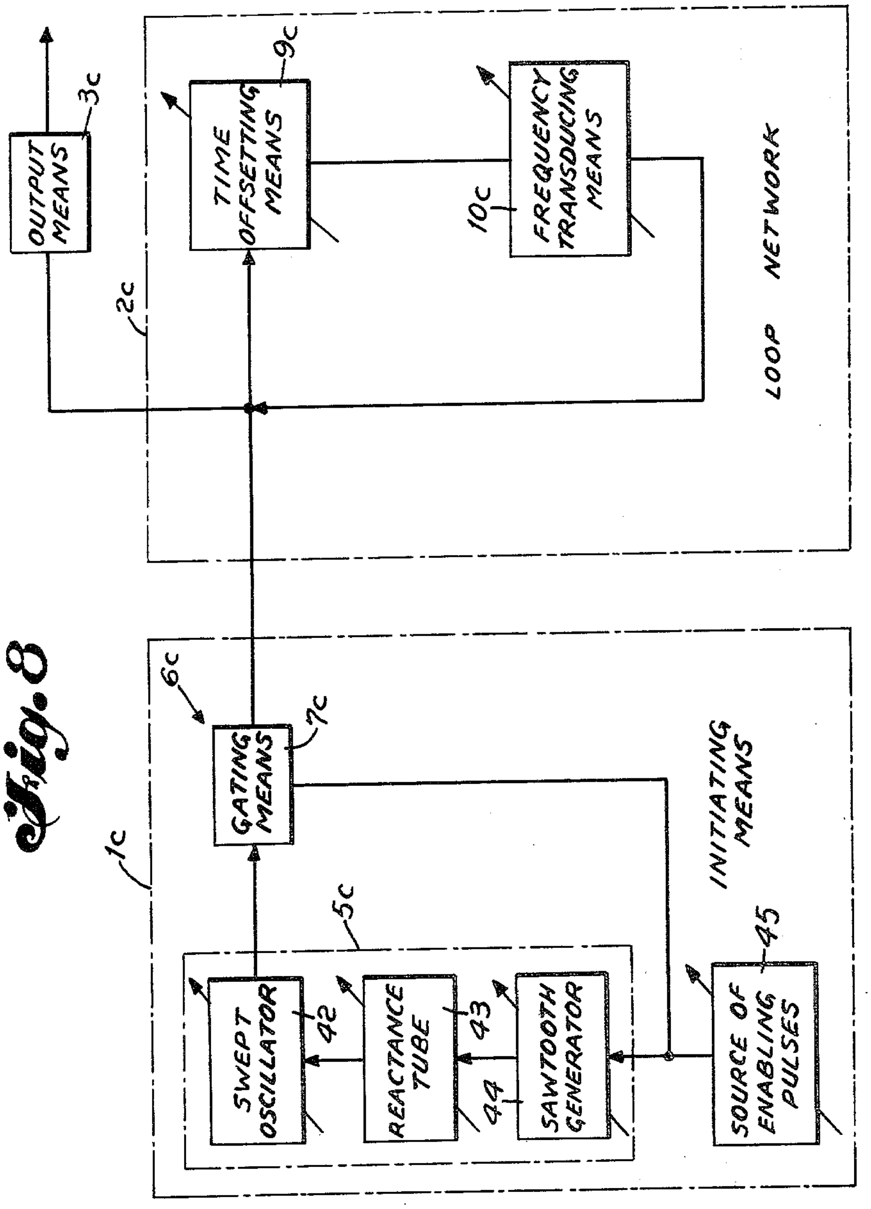
FIG. 8 is a schematic diagram in block form of still another embodiment of the signal generator of this invention.

As stated previously, the signal initiated into the loop network need not have a fixed or constant frequency but may have a variable frequency. Accordingly, there is illustrated in FIG. 8 an embodiment of the signal generator of this invention which has initiated into loop network 2$c$ a signal having a frequency which varies linearly, by way of example only, with time. The signal generator of FIG. 8 comprises initiating means 1$c$ which initiates the linearly varying frequency signal into loop network 2$c$ where it will be recurrently circulated in a manner to be hereinafter described. Loop network 2$c$, by way of example only, includes suitable time-offsetting means 9$c$ and frequency-transducing means 10$c$ similar to those illustrated in the loop network 2$a$ of FIG. 5. Suitable output means 3$c$, in the form of a conductor or bandpass filter, is coupled to the loop network 2$c$ to extract the signal therefrom. Initiating means 1$c$ comprises a source 5$c$ of signals illustrated as a signal generator in a form of a swept-frequency oscillator 42, a reactance tube 43 coupled to the tank circuit of oscillator 42 and a sawtooth generator 44 coupled to the reactance tube 43. In an unswept condition, oscillator 40 generates a constant frequency $f_0$. Sawtooth generator 44 activates reactance tube 43 to sweep the frequency of the output signal of oscillator 42 in a manner well known to those skilled in the art. A source 45 of enabling pulses provides a means to control the action of sawtooth generator 44 and coupling means 6$c$, illustrated as gating means 7$c$.

Figure 9:
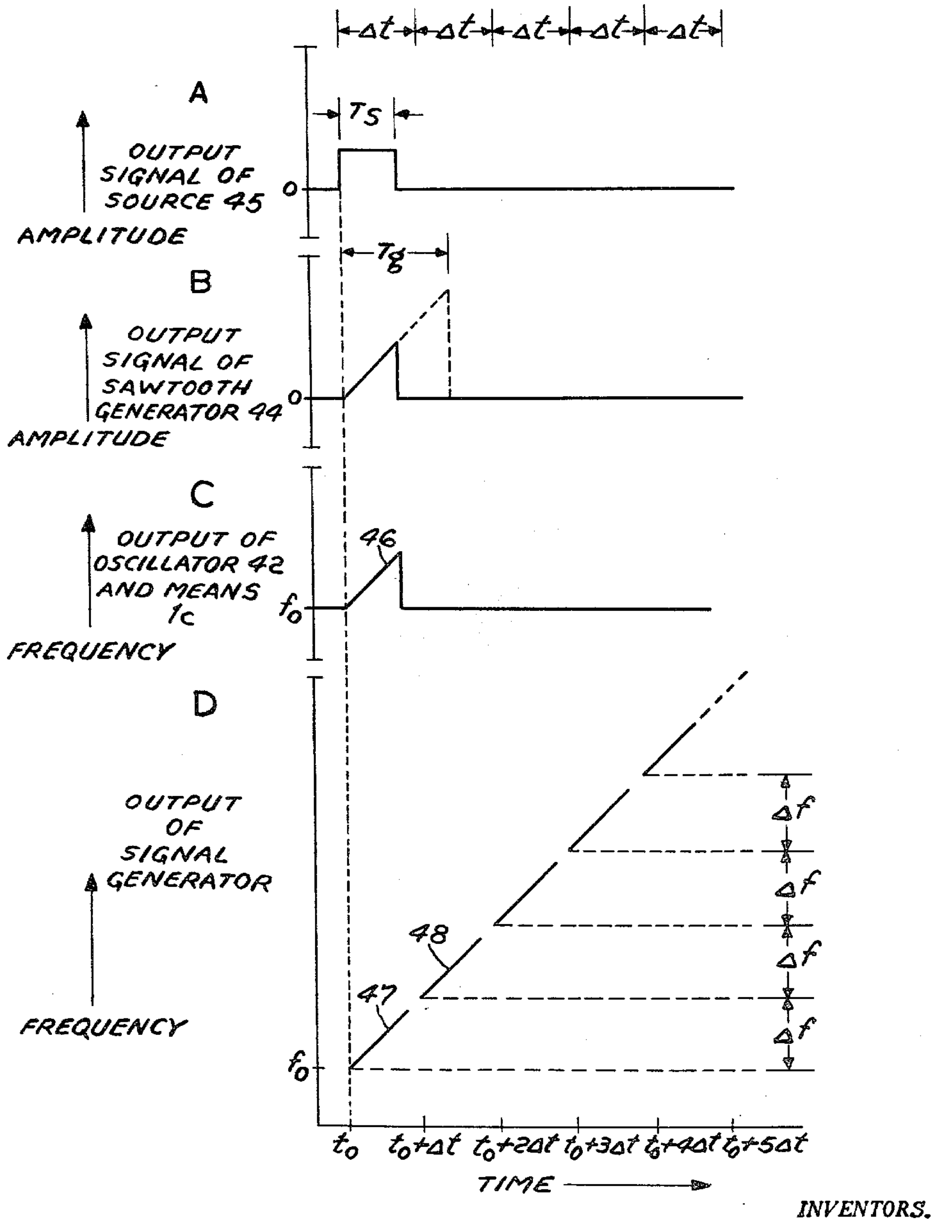
FIG. 9 illustrates waveforms helpful in explaining the operation of the signal generator of FIG. 8.

Referring to FIG. 9, the operation of signal generator of FIG. 8 is as follows. An enable pulse, Curve A, FIG. 9, is generated by source 45 which simultaneously initiates the action of gating means 7$c$ and the operation of sawtooth generator 44 commencing at the time $t_0$. For the sake of clarity, the gating period $T_s$ is indicated in FIG. 9 as being less than the time-delay interval $\Delta t$ of the time-offsetting means 9$c$. Sawtooth generator 44, as is well known in the art, generates an output wave, Curve B, FIG. 9, whose amplitude varies linearly with time. With the gating period $T_s$ adjusted to be less than or equal to the sawtooth wave period $T_g$, generator 44 modulates reactance tube 43 causing the swept oscillator 42 to produce a signal 46 having a linear swept-frequency characteristic at its output as illustrated at Curve C, FIG. 9. The signal 46 at the output of oscillator 42 is coupled to the loop network 2$c$ via gating means 7$c$, for recurrent circulation therein and simultaneously appears at output means 3$c$, illustrated in Curve D, FIG. 9, as signal 47. Each of the frequency components present in signal 47 encounters a time delay $\Delta t$ and frequency deviation $\Delta f$ as signal 47 is circulated within loop network 2$c$ due to the presence of the time-offsetting means 9$c$ and frequency-transducing means 10$c$ therein. Thus, at the end of the first circulation, signal 47 will appear at the output means 3$c$ as signal 48, whereupon signal 48 will again circulate in a manner similar to that described in the circulation of signal 47. If the slope of the signal 46 of oscillator 42 is maintained substantially equal to the slope $\Delta f/\Delta t$ produced by the frequency-transducing means 10$c$ and time-offsetting means 9$c$, the signal will appear at the output means 3$c$ as a smooth linear curve. However, it is not essential that the slope of signal 46 of oscillator 42 be maintained equal to the slope $\Delta f/\Delta t$ determined by the time-offsetting means 9$c$ and frequency-transducing means 10$c$ because after the swept signal 46 is initiated into loop network 2$c$ and circulated therein, the employment of a bandpass filter as output means 3$c$ will smooth the resultant signal extracted from loop network thereby substantially eliminating any discrepancies between the slope of signal 46 and the desired slope $\Delta f/\Delta t$ of the output signal of the signal generator. By approximating the slope of the signal 46 to the desired slope $\Delta f/\Delta t$ at the output of the signal generator, the filtering problem at means 3$c$ is eased relative to the filtering problem present in the embodiment of FIGS. 1 and 5. The embodiment of FIG. 8 has been described, for purpose of explanation, having a signal with a positive linear frequency characteristic being initiated in loop network 2$c$. It is obvious, however, to one skilled in the art that the principles of this embodiment may be also applied to an arrangement where a negative, as well as a non-linear, frequency-characteristic signal is initiated in loop network 2$c$. As was mentioned previously, the frequency-transducing means 10$c$ may also produce a non-linear frequency deviation.

Ordinarily, because the signal has an initial slope which tends to mitigate the aforementioned effects of amplitude and frequency modulation, a smoothing filter is not required. However, if the output signal needs to be smooth, as described above, it is understood that a bandpass filter may be included in the output of means 3*c* of FIG. 8.

Referring to FIG. 10, there is illustrated another embodiment of the signal generator of this invention. In this embodiment, a signal having a given frequency characteristic is initiated in loop network where it is maintained circulated by being compared to its time-offset and frequency-transduced counterpart so as to control the frequency characteristic in a predetermined manner, as will be described in greater detail hereinafter. Accordingly, initiating means 1*d* comprises a control means, such as a source 49 of enabling pulses whose output is coupled to a source 5*d* of signals having a given amplitude characteristic, such as a sawtooth generator 50. The enabling pulses of source 49 initiate the action of sawtooth generator 50 and simultaneously control and initiate the operation of coupling means 6*d* illustrated as gating means 7*d* which couples the signals of the output of sawtooth generator to the loop network 2*d* in a manner to be described hereinafter.

Loop network 2*d* comprises an oscillator 51 of the swept-frequency type having a tuned circuit whose resonant frequency may be adjusted by reactance tube 52. If desired, the initial operation of swept oscillator 51 may also be controlled by the pulses of source 49 by closing switch 53. The swept oscillator 51, which provides a signal having a given frequency characteristic for recurrent circulation in loop network 2*d*, is coupled to the input of time-offsetting means 9*d* having a time delay of $\Delta t$ and hence to frequency transducing means 10*d* having a frequency deviation of $\Delta f$. Loop network 2*d* is completed by a phase-lock loop including phase comparator 54 such as a balanced modulator, which is coupled to the output of oscillator 51 and the output of frequency-transducing means 10*d*, and a control signal path 54*a* coupled to the output of phase comparator 54 and the control input of reactance tube 52. Control signal path 54*a* may couple the output of phase comparator 54 to reactance tube 52, or may couple the output of phase comparator 54 to reactance tube 52 by means of integrator 55 depending upon the position of switch 56, the position thereof being determined by the control signal developed at the output of phase comparator 54. Coupled to loop network 2*d* at point 4*d* are suitable output means 3*d*, a conductor 57 or bandpass filter 58, the latter means being utilized to mitigate the aforementioned effects of amplitude and frequency modulation, if present. The connection of conductor 57 or filter 58 is effectuated by the relative positioning of the switch 57*a*.

Various arrangements including oscillator 51 may be employed to initiate a signal in loop network 2*d*. Oscillator 51 may be a continuous-wave oscillator having an operating frequency of $f_0$ placed into operation as soon as the "on-off" switch, not shown, is activated. In this arrangement, oscillator 51 is operated upon by sawtooth generator 50 and reactance tube 52 only to sweep the frequency of the output signal therefrom from $f_0$ to $f_0+\Delta f$. In other words, switch 53 is open as is illustrated. A second arrangement would include a switch, such as a gas-tube switch, in the circuitry of oscillator 51 which would place oscillator 51 in operation at a predetermined time to produce a signal having a frequency $f_0$ to be frequency swept in the same manner as the previous arrangement. In this arrangement, switch 53 is closed to apply the enable pulses of source 49 to oscillator 51 to start the operation thereof at a frequency $f_0$ simultaneously with the occurrence of the leading edge of the enable pulse, in other words, at the beginning of the time interval $T_s$. A third arrangement would include a regular oscillator as oscillator 51, which is triggered into operation by the output of source 49 such that the oscillator builds up to its stable oscillating condition at the end of the time interval $T_s$ at which time the phase-lock loop will sweep the frequency of the output signal. In this latter arrangement, switch 53 will be closed and switch 53*a* will be opened to disconnect sawtooth generator 50 from reactance tube 52.

Figure 11A:
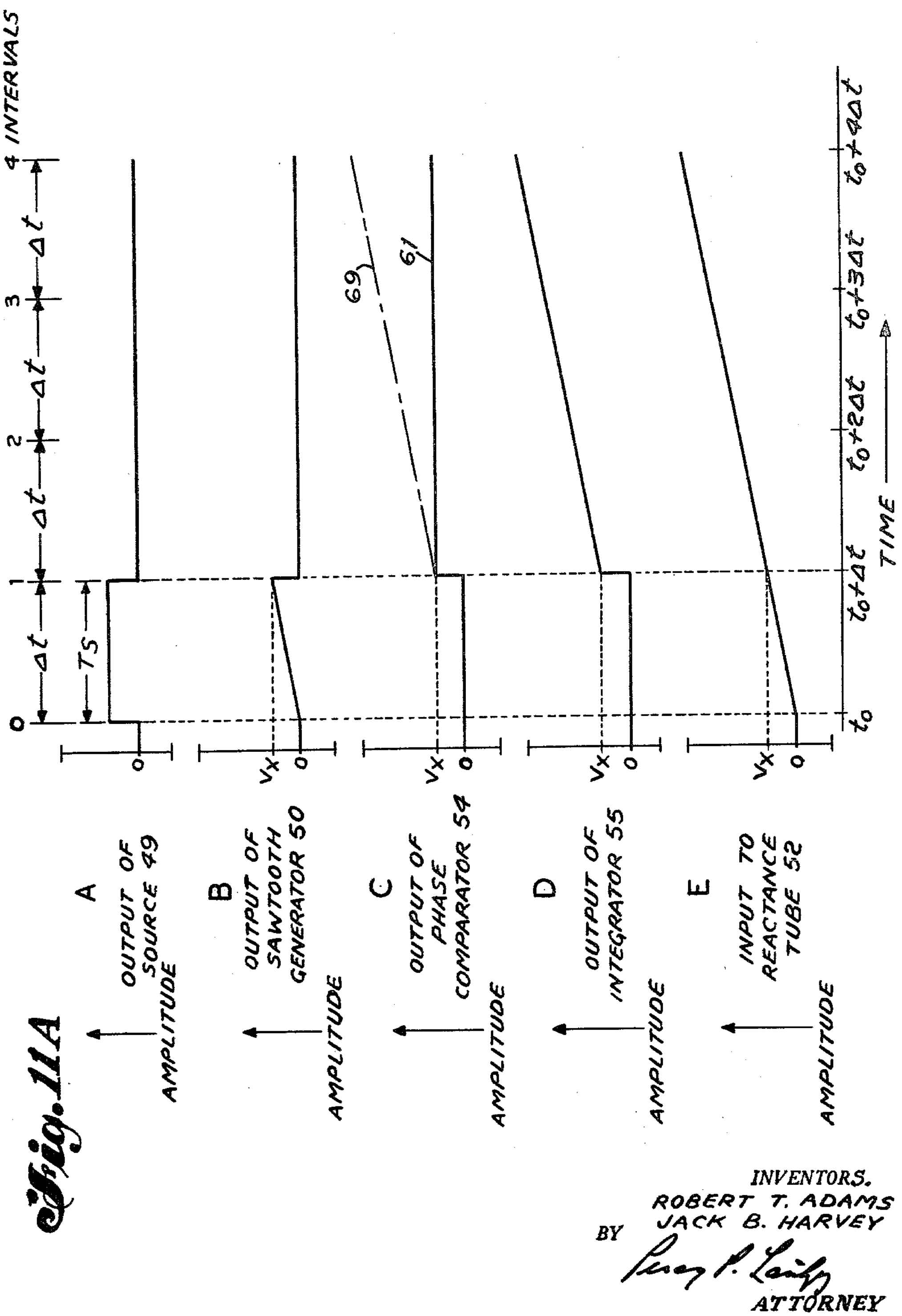
FIGS. 11A and 11B illustrate waveforms helpful in explaining the operation of the signal generator of FIG. 10.
Figure 11B:
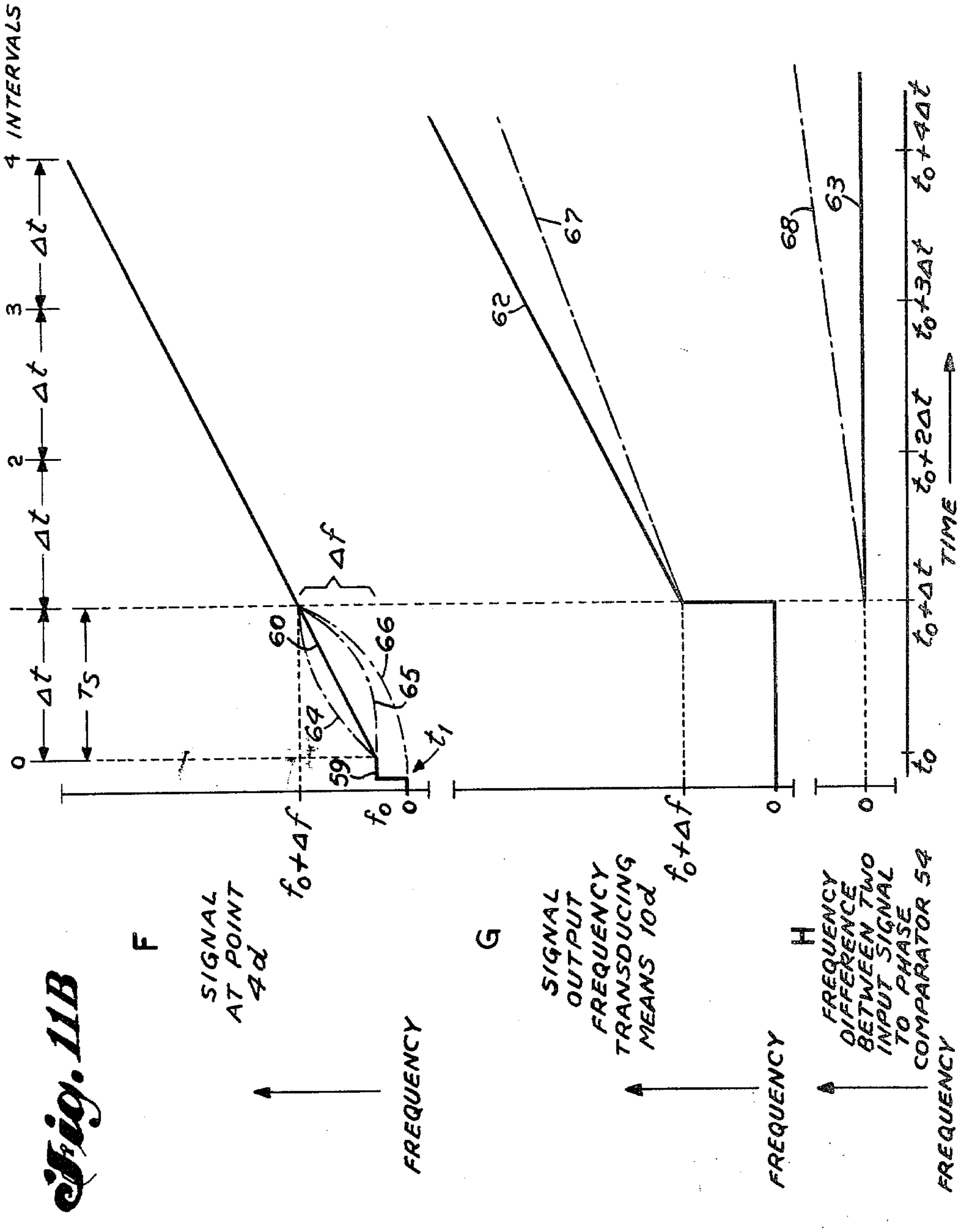

Referring to FIGS. 11A and 11B, the operation of the signal generator of FIG. 10 will be described. For purposes of explanation, oscillator 51 operates with switches 53 and 53*a* in the illustrated position, that is, in accordance with the first arrangement described hereinabove. An enabling pulse, having a width of $T_s$ seconds, Curve A, FIG. 11A, is generated by source 49 starting at the time $t_0$ simultaneously initiating the sweep output of sawtooth generator 50, Curve B, FIG. 11A and operating gating means 7*d* to couple the output signal of sawtooth generator 50 to reactance tube 52. The amplitude of the output signal of sawtooth generator 50, Curve B, FIG. 11A, shown by way of example only, increases 0 volts to $V_x$ volts during the period $T_s$ to modulate the reactance tube 52 and, hence, sweep the frequency of the output signal of swept oscillator 51, in a well known manner, and thereby initiates a signal in the loop network 2*d* for the recurrent circulation therein at the time $t_0$. Thus, upon turning on the signal generator at $t_1$, a signal having a frequency equal to $f_0$ is present in the output of the swept oscillator 51 as illustrated at 59, Curve F, FIG. 11B. Commencing at $t_0$, the output signal of swept oscillator 51 is frequency swept by means of the sawtooth generator 50 and reactance tube 52 for the interval $T_s$ as illustrated at 60, Curve F, FIG. 11B. In the operation of the present embodiment, it is required that the energy-amplitude characteristic or slope of the signal of the sawtooth generator be selected such that at the time $t_0+\Delta t$, the frequency of the output signal of swept oscillator 51 will be substantially advanced to equal $f_0+\Delta f$, to permit operation of the phase-lock loop as explained hereinafter. It is also desirable to have the time interval between $t_0$ and $t_1$ as small as possible and preferably coincident.

The initiated signal appearing at the point 4*d* is simultaneously fed to output means 3*d*, time-offsetting means 9*d*, and phase comparator 54. During the initial or first interval $T_s$, the output signal of swept oscillator 51, that is, portion 60 of Curve F, FIG. 11B, will be present at point 4*d* only because the time-delay interval $\Delta t$ of time-offsetting means 9*d* will prevent the signal at point 4*d* from appearing at the output of frequency-transducing means 10*d* until a time interval $\Delta t$ has elapsed which in the first interval occurs at time equal $t_0+\Delta t$. Consequently, during the first interval, no signal will be present at the output of phase comparator 54, as illustrated in Curve C, FIG. 11A. At the time $t_0+\Delta t$, the signal at the output of swept oscillator 51 will have a frequency equal to $f_0+\Delta f$ as illustrated in Curve F, FIG. 11B, and the signal at the output of time-offsetting means 9*d* coupled to phase comparator 54 through frequency-transducing means 10*d* will also have a frequency equal to $f_0+\Delta f$ as illustrated in Curve G, FIG. 11B. Thus, the signal at point 4*d* has been advanced to $f_0+\Delta f$ by the sweep of sawtooth generator 50, and the signal at the output of frequency-transducing means 10*d* will be the result of the initial signal, $f_0$, of swept oscillator 51 having encountered a frequency deviation $\Delta f$ due to the presence of frequency-transducing means 10*d* in the loop network 2*d*. Phase comparator 54 may be a device such as a balanced modulator that will produce an output signal of constant amplitude when the signals applied thereto are in-phase. Hence, at time $t_0+\Delta t$, there will be simultaneously present at the two inputs, of phase comparator 54, two in phase signals having the same frequency $f_0+\Delta f$, resulting in a control signal at the output of phase comparator 54 having an amplitude level $V_n$ as illustrated by line 61 of FIG. 11A. As a result thereof, with switch 56 in the illustrated position, the control signal output of phase comparator 54 is coupled to the integrator 55. The coaction between integrator 55 and the amplitude $V_n$ of the control-signal output of phase comparator 54 is such that the signal at the output of integrator 55 will have at time $t_0+\Delta t$ an amplitude $V_x'$, Curve D, FIG. 11A, which is substantially equal to $V_x$, the amplitude of the output signal of sawtooth generator 50 at $t_0+\Delta t$. The signal output of integrator 55 is applied to the reactance tube 52 at substantially the same time that the output signal of sawtooth generator 50 ceases. Due to the presence of the instantaneous output signal $V_n$ of phase comparator 54 and its corresponding instantaneous output signal of integrator 55, the swept oscillator via reactance tube 52 will continue to be swept at a slope $\Delta f/\Delta t$ immediately after the time $t_0+\Delta t$. The time constant of integrator 55 is adjusted to operate on the amplitude $V_n$, of the output signal of phase comparator 54, line 61 of Curve C, FIG. 11A, so as to produce an amplitude-increasing signal, at the output of integrator 55, Curve D, FIG. 11A, having a slope which maintains the signal Curve F, FIG. 11B, at point *4d* substantially at the same instantaneous frequency as that of the signal at the output of frequency-transducing means 10*d*, line 62, Curve G, FIG. 11B. Thus, the output signal of swept oscillator 51, Curve F, FIG. 11B will be "locked" to the output signal of frequency-transducing means 10*d* after the time $t_0+\Delta t$. In this manner, the signal from swept oscillator 51 continues to be circulated in loop network *2d* after the time $t_0+\Delta t$ until such time as the output signal is terminated due to any of the aforementioned reasons set forth in the previous embodiments. Thus, at output means *3d* of the signal generator of FIG. 10, there will appear a signal having the frequency characteristic illustrated in Curve F, FIG. 11B.

Curve E, FIG. 11A represents a composite of the Curves B and D, and illustrates more clearly the transition which takes place at the control input of reactance tube 52 at the time $t_0+\Delta t$. Line 63 of Curve H, FIG. 11B represents the relative frequency difference between the two signals coupled to phase comparator 54 commencing at the time $t_0+\Delta t$ and which is illustrated as a constant value, viz., zero.

It will be readily seen that the manner of sweeping oscillator 51 by initiating means 1*d* during the period $T_s$ is immaterial as long as the initial frequency which it had at the time $t_0$ has been advanced at time $t_0+\Delta t$, to the frequency of the signal present at the output of transducing means 10*d* at the time $t_0+\Delta t$. Thus, there is illustrated in Curve F, FIG. 11B by way of example only, two non-linear output signals, represented by the dashed lines 64 and 65, which originate at $t_0$ with a frequency $f_0$ and at the time $t_0+\Delta t$ terminate at a frequency $f_0+\Delta f$.

Alternatively, as described hereinabove in connection with the arrangements of swept oscillator 51, a regular oscillator could be triggered to build up to its stable oscillating condition during the period $T_s$ so that the stable oscillating frequency is equal to the $\Delta f$ of frequency-transducing means 10*d*. Consequently, in the illustration of Curve F, FIG. 11B, line 66 represents the operation of such an arrangement with the $\Delta f$ of this arrangement being increased in value to equal the value of $f_0+\Delta f$ of the arrangement operating as illustrated in lines 60, 64 and 65. From this point, at time $t_0+\Delta t$, the control signal of phase comparator 54 will sweep the frequency of the output of the oscillator to produce the remainder of the Curve F, FIG. 11B. The sawtooth generator 50 may be dispensed with under this arrangement, or so arranged as to aid in the build-up of the oscillations.

It is to be further understood that the switching period, $T_s$, may be less than the time-delay interval $\Delta t$ of the time-offsetting means *9d* as the inertia of the output of sawtooth generator or its equivalent may be sufficient to bring the frequency of the output signal of swept oscillator 51 to the desired frequency level, i.e., $f_0+\Delta f$, by the time $t_0+\Delta t$ is reached. In order to insure the absolute presence of signals at the inputs of phase comparator 54 at the time $t_0+\Delta t$, it might be preferable to have the switching time, $T_s$, slightly larger than the time delay interval $\Delta t$.

The utilization of integrator 55 may be dispensed with in some cases. In such cases, switch 56 would be moved to its other position to bypass integrator 55, and the control-signal output of phase comparator 54 would have the characteristic of Curve D, FIG. 11A, and would be connected directly to reactance tube 52. One method of producing such a characteristic at the output of phase comparator 54 is to maintain a variable relative frequency difference between the two signals coupled to phase comparator 54, as for example, by the appropriate continuous adjustment of the slope-determining components, time-offsetting means *9d* and frequency-transducing means 10*d*, to produce a signal having a characteristic as illustrated by line 67, Curve G, FIG. 11B at the output of frequency-transducing means 10*d*. As is seen from the composite waveform 68 of Curve H, FIG. 11B, a variable frequency-difference, that is, a variable frequency differing as a function of time, exists between the two signals, coupled to phase comparator 54, viz., the signal illustrated by waveform 60 of Curve F, FIG. 11B and the signal illustrated by waveform 67 of Curve G, FIG. 11B, and which results in a signal illustrated in waveform 69 of Curve C, FIG. 11B at the output of phase comparator 54, which drives reactance tube 52 directly. In such a case, Curve E, FIG. 11A would then be a composite of waveform 69 of Curve C and the waveform of Curve B.

It is to be understood that, while the operation of the signal generator of FIG. 10 is described as producing a signal output that has a positive linear frequency characteristic, it will be obvious to one skilled in the art that negative as well as non-linear frequency characteristics are obtainable as explained in the previously described embodiments.

It will be obvious to a practitioner in the field that cascade arrangements of the embodiments described can be employed to give swept-frequency output signals having other than linear characteristics. For instance, if any of the embodiments described above are substituted for the frequency-transducing means 10 in another embodiment, it would be possible to produce a parabolic swept frequency since the frequency offset would now be a function of time.

Figure 12:
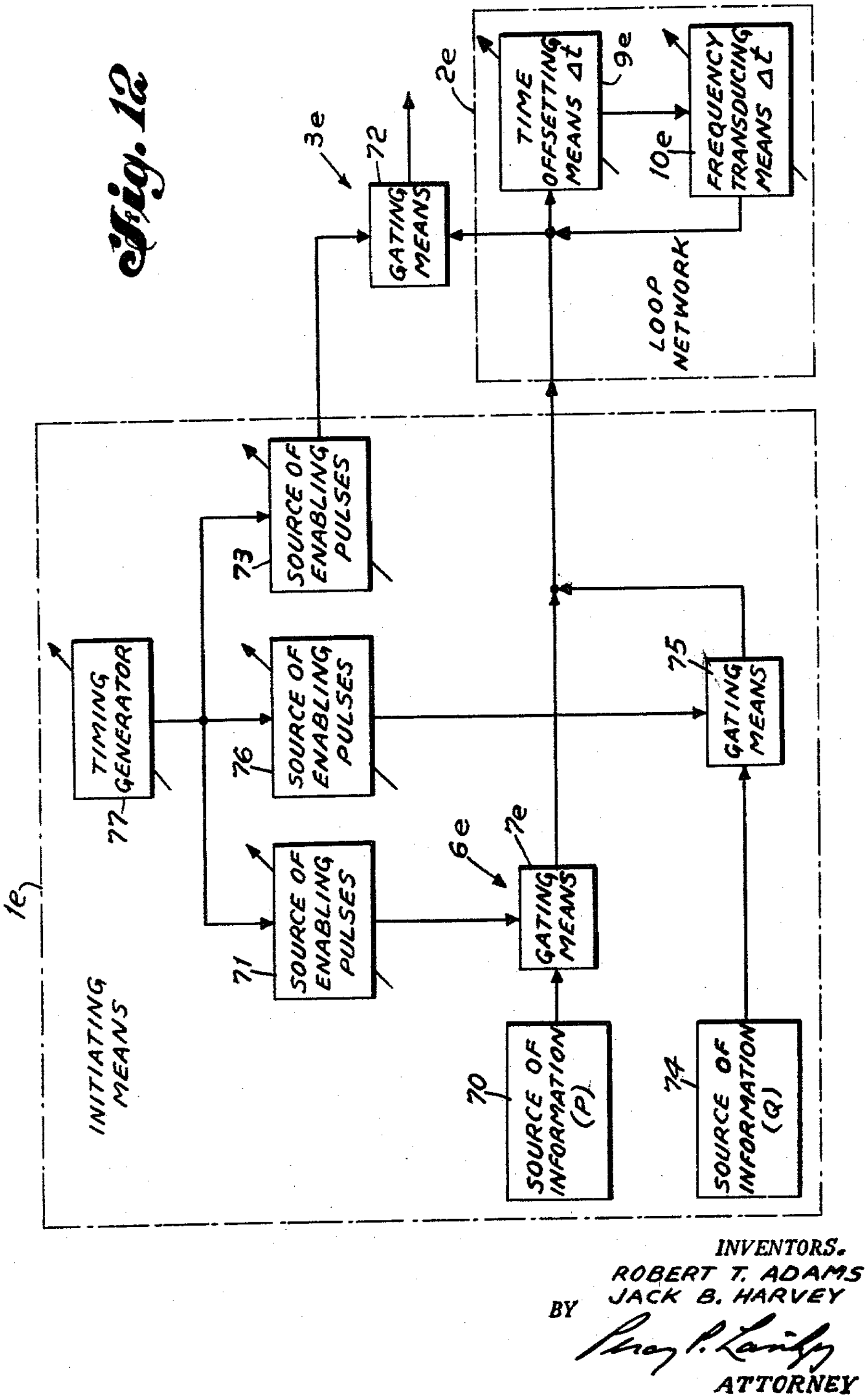
FIG. 12 is a schematic diagram in block form of the signal generator of this invention providing a data-transmission system.

Referring to FIG. 12, there is illustrated an embodiment of the signal generator of this invention utilized as a data-transmission system capable of handling one or more channels of information. Initiating means 1*e* initiates an information signal into the loop network 2*e* for recurrent circulation therein in a manner similar to that described in the aforementioned embodiments and which will be described in greater detail hereinafter. Accordingly, for single-channel operation, initiating means 1*e* includes a source 70 of information signals designated as P signals coupled to loop network 2*e* by coupling means *6e* illustrated, for example, as gating means *7e*. The source 70 may include suitable information-transducing means which converts information which is in one form of energy, e.g. acoustical, video, thermal, electrical, into electrical energy of a different type. Such devices are widely known in the prior art and include, for example, in the case of acoustical energy devices such as microphones. Control means illustrated as a source 71 of enabling pulses controls the action of gating means *7e* to couple the information of source 70 to loop network 2*e*.

Loop network 2*e* includes suitable time-offsetting means *9e* having a time-delay interval $\Delta t$ and frequency-transducing means 10*e* having a frequency deviation $\Delta f$ similar to the components of the loop network of the previously described embodiments. Output means *3e* is a suitable gating means 72 to extract the recurrently circulating signal from the loop network 2*e* during a predetermined time interval after a predetermined number of circulations. The action of gating means 72 is controlled by the source 73 of enabling pulses. To provide multiple-channel operation, initiating means 1e would include a plurality of sources of information. For the sake of clarity, the multiple-channel arrangement is illustrated as a two-channel system with the source 74 of information signals designated as Q signals providing the second channel of intelligence. Source 74 is coupled to the loop network 2e by a coupling means illustrated as gating means 75. Source 74 also may include an information transducer which may be similar to or different than the transducer of source 70. The action of gating means 75 is controlled by a control means illustrated as a source 76 of enabling pulses. A suitable synchronizing means illustrated as timing generator 77 synchronizes the action of sources 71, 73 and 76.

Figure 13:
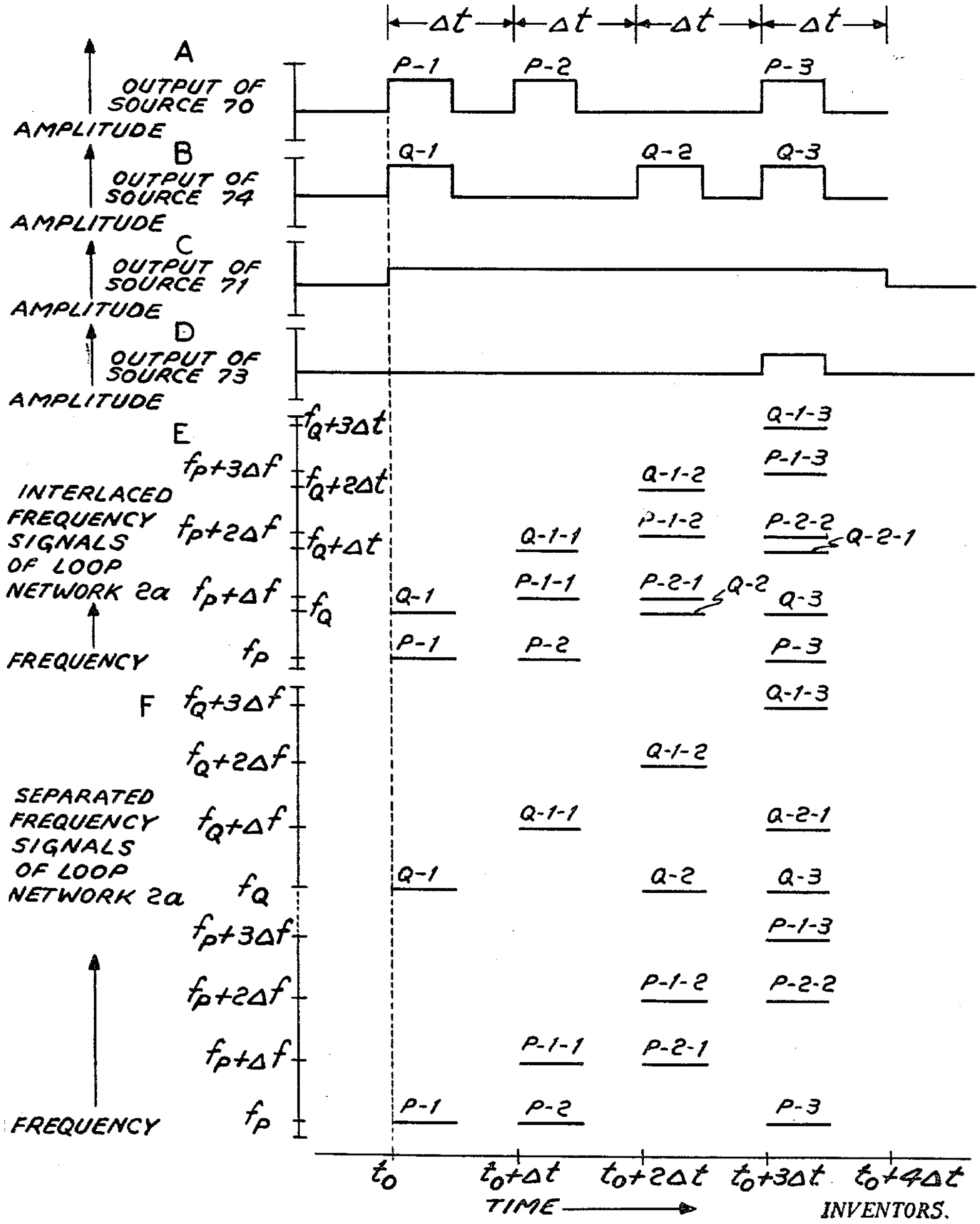
FIGS. 13 and 14 illustrate waveforms helpful in explaining the operation of the signal generator of FIG. 12.
Figure 14:
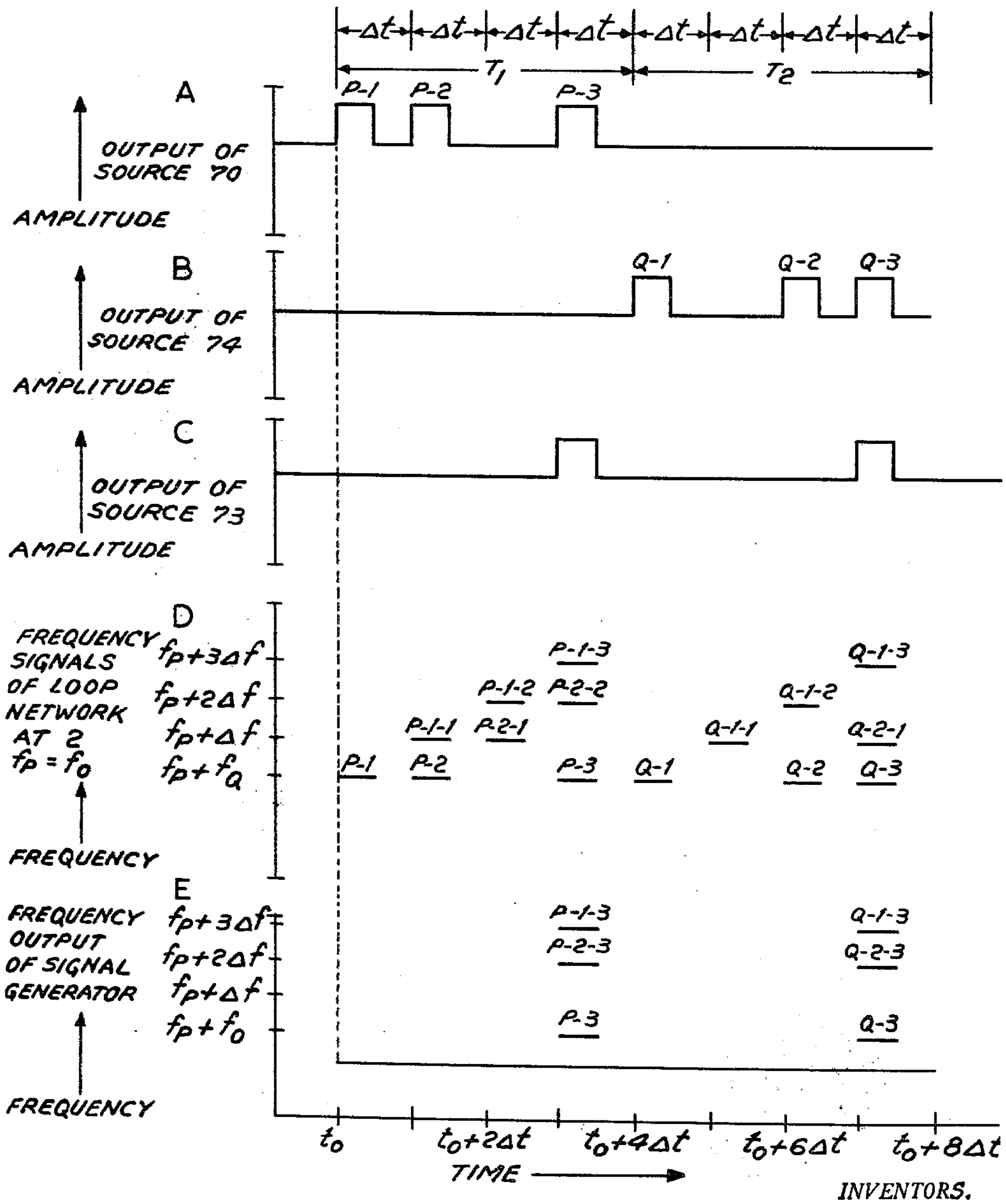

Referring to FIGS. 13 and 14, the operation of the signal generator of FIG. 12 will be described. In the single-channel version, only source 70 is coupled to loop network 2e and provides, by way of example, information signals in binary code form represented by the presence or absence of pulses in sequential time intervals. For purposes of explanation, a single signal sample is represented in Curve A, FIG. 13 including pulses P–1, P–2 and P–3 in certain one of the time intervals as illustrated of a predetermined number of time intervals determined by the number of digits or code elements used to convey a signal sample. For the sake of clarity, the time interval of the code elements of the coded information signal sample is selected to be equal to that of the time-delay interval $\Delta t$ of time-offsetting means 9e. It will be apparent, however, to those skilled in the art that lesser or greater time intervals may be utilized, as well as other types of information signals without departing from the scope of this invention. An enable pulse, Curve C, FIG. 13, originating from source 71 opens the gate 7e at time $t_0$. For the sake of clarity, source 70 is preadjusted to begin its message at $t_0$. During the first interval $\Delta t$, the pulse P–1, of Curve A, FIG. 13 whose initial frequency is $f_p$ will be translated in frequency by an amount equal to $\Delta f$ due to the presence of the frequency-transducing means 10e and will appear as the signal P–1–1 as illustrated in Curve F, FIG. 13 at $t_0+\Delta t$. Simultaneously, pulse P–2 which, by way of example only, also has the same frequency as P–1, namely $f_p$ will be injected into loop network 2e whereupon both signals P–1–1 and P–2 will be circulated within loop network 2e and undergo a time offset of $\Delta t$ and a frequency deviation $\Delta f$, such that the signals P–1–1 and P–2 at the completion of the second interval, namely, at time $t_0+2\Delta t$, will appear as time coincident signals P–1–2 and P–2–1 and will have a frequency $f_P+2\Delta f$ and $f_P+\Delta f$, respectively, as illustrated in Curve F, FIG. 13. It should be noted that pulse P–2 need not have the same frequency as pulse P–1. At the commencement of the time interval $t_0+2\Delta t$, because of the absence of a pulse during that interval, only two signal elements viz., the signals P–1–2 and P–2–1, will be circulated within the loop. Upon completion of their circulations, these signals will again be frequency deviated $\Delta f$ and time offset $\Delta t$ and appear at the beginning of the time interval $t_0+3\Delta t$ as signals P–1–3 having a frequency $f_3+3\Delta f$ and P–2–2 having a frequency $f_P+2\Delta f$. Simultaneously at the beginning of the interval $t_0+3\Delta t$ the signal P–3 is injected into loop network 2e. At this time, an enable pulse, Curve D, FIG. 13, from source 73 synchronized by timing generator 77 opens gating means 72 and simultaneously transmits the time-coincident signals P–1–3, P–2–2, and P–3 from output means 3e. Alternately, source 73 could provide a gate signal that operates gating means 72 after a predetermined number of circulations of all the signal elements in loop network 2e. Thus, the signals of source 70 have been transformed from a plurality of sequential time signals, P–1, P–2, P–3, to time-coincident signals separated in accordance with frequency-division techniques thereby allowing the simultaneous transmission of the signal elements of source 70 during the same time interval. If gating means 72 is held open by the enable pulse of source 73 for the entire message interval of source 70, all the signals appearing in each time interval would be passed to the output of output means 3e, that is, both the injected and circulated pulses. This feature could be utilized as an error-checking arrangement for a long-distance system since the presence of a signal element in one time interval and not in a succeeding one would indicate an error due to atmospheric disturbance or the like.

In the multiplex operation, a plurality of information sources are coupled to loop network 2e to provide a plurality of information messages to be transmitted. One of the many methods of performing the multiplex operation is to assign the information signals, Curve A, FIG. 13, of source 70 and the information signals, Curve B, FIG. 13 of source 74 different frequencies $f_P$ and $f_Q$, respectively. As illustrated in Curve E, FIG. 13 frequencies $f_P$ and $f_Q$ may be fully interlaced or, as illustrated in Curve F, FIG. 13, frequencies $f_P$ and $f_Q$ may be separately stacked. Under this method, the information signals, Curves A and B, FIG. 13 of sources 70 and 74, respectively, are coupled to the loop network 2e simultaneously by their respective gating means 7e and 75 by adjustment of their respective enable-pulse sources 71 and 76. The circulation of the signals P and Q in the loop network 2e is similar to that described in the description of the single-channel arrangement following the sequence illustrated at Curves E and F, FIG. 13 for the interlaced and separated frequency cases, respectively. Thus, it can be seen that the signals of sources 70 and 74 have been converted from time-sequential and frequency-spaced signals to time-coincident frequency-spaced signals or, in other words, a form of frequency-multiplexed signals.

Still another method of effectuating multiplex operation is to have the information messages of the sources, which may be or may not be at the same frequencies, transmitted at staggered time intervals. Under this method, the information signals, Curves A and B, FIG. 14 of the respective sources 70 and 74 appear in the message intervals $T_1$ and $T_2$, respectively. For the sake of simplicity, the frequency of the signals of sources 70 and 74 are chosen to be equal, i.e., $f_P$ equals $f_Q$ but need not be. The actions of the gates 7e and 75 are controlled by proper adjustment of the respective enabling-pulse sources 71 and 76 which are synchronized by timing generator 77. During the time periods $T_1$ and $T_2$, the signals of sources 70 and 74 are respectively circulated in loop network 2e in a manner similar to that described with respect to the signal-channel system as illustrated in Curve D, FIG. 14. During the last time interval of each message interval, $T_1$ and $T_2$, gating means 72 is operated by source of enabling pulses 73, Curve C, FIG. 14 to prorespect to the single-channel system as illustrated in Curve E, FIG. 14. Thus, it can be seen that the signals of sources 70 and 74 have been multiplexed on a time and frequency basis.

It is obvious to one skilled in the art that the signal generator of this invention may be utilized in other types of multiplex systems too numerous to warrant description herein.

The frequency-transducing means 10e when used in the multiplex arrangement, should include a non-distorting amplitude-regulating means, such as an automatic-gain-control circuit, and not a limiter, to prevent interferences between the intelligence signals of sources 70 and 74.

While we have described the principles of our invention in connection with specific apparatus, it is to be clearly understood that this description is made by way of example and not as a limitation to the scope of our invention as set forth in the objects thereof and the accompanying claim.

We claim:

A signal generator comprising a loop network for the recurrent circulation therein of a signal having a given frequency characteristic, including time-offsetting means to offset said signal a predetermined time interval during each of said circulations and a frequency-transducing means to vary said given frequency characteristic in a predetermined manner during each of said circulations, means to initiate said signal within said loop network for said recurrent circulation, and output means coupled to said loop network to extract said signal during preselected ones of said circulations to provide an output signal for said signal generator, said frequency-offsetting means including a heterodyning arrangement to vary said given frequency characteristic, said heterodyning arrangement including a first oscillator to produce at the output thereof a signal having a first preselected frequency characteristic, a first means coupled to said first oscillator and in a series relation with said time-offsetting means to mix said circulating signal and the signal of said first oscillator during each of said circulations, a first frequency-selective means coupled to said first mixing means to pass therethrough a signal having a given frequency related to the frequencies of the signals coupled to said mixing means, a second oscillator to produce at the output thereof a signal having a second preselected frequency characteristic, a second means coupled to said first frequency-selective means and said second oscillator to mix the signals at the output of said first frequency-selective means and the signals of said second oscillator, and a second frequency-selective means coupled to the output of said second mixing means to pass therethrough a signal having a given frequency related to the frequencies of the signals coupled to said second mixing means for circulation in said loop network, said means to initiate said signal including an initiating oscillator, a timing generator, a first source of enabling pulses controlled by said timing generator, gating means controlled by pulses from said first source of enabling pulses to admit oscillations from said initiating oscillator to said loop network, and a second source of enabling pulses controlled by said timing generator, the pulses from said second source of enabling pulses being fed to said first oscillator and to said second oscillator.

References Cited by the Examiner

UNITED STATES PATENTS

| | | | |
|---|---|---|---|
| 1,604,140 | 10/26 | Affel | 331—39 |
| 2,419,569 | 4/47 | Labin | 328—53 |
| 2,482,974 | 9/49 | Gordon | 328—19 |
| 2,640,917 | 6/53 | Phinney | 329—1 |
| 2,770,722 | 11/56 | Arams | 328—53 X |
| 2,841,704 | 7/58 | Sunstein et al. | 331—39 X |
| 2,920,289 | 1/60 | Meyer | 328—15 X |
| 2,992,396 | 7/61 | Fromm et al. | 331—39 |
| 3,013,213 | 12/61 | Rich | 328—72 X |
| 3,048,794 | 8/62 | Ares | 328—38 X |

ROY LAKE, *Primary Examiner.*

IRVING L. SRAGOW, JOHN KOMINSKI, *Examiners.*